(12) United States Patent
Pickerd et al.

(10) Patent No.: US 11,923,895 B2
(45) Date of Patent: Mar. 5, 2024

(54) OPTICAL TRANSMITTER TUNING USING MACHINE LEARNING AND REFERENCE PARAMETERS

(71) Applicant: Tektronix, Inc., Beaverton, OR (US)

(72) Inventors: John J. Pickerd, Hillsboro, OR (US); Kan Tan, Portland, OR (US); Evan Douglas Smith, Portland, OR (US); Heike Tritschler, Louisville, CO (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 17/701,186

(22) Filed: Mar. 22, 2022

(65) Prior Publication Data
US 2022/0311513 A1 Sep. 29, 2022

Related U.S. Application Data

(60) Provisional application No. 63/272,998, filed on Oct. 28, 2021, provisional application No. 63/165,698, filed on Mar. 24, 2021.

(51) Int. Cl.
*H04B 10/077* (2013.01)
*H04B 10/40* (2013.01)

(52) U.S. Cl.
CPC ......... *H04B 10/0779* (2013.01); *H04B 10/40* (2013.01)

(58) Field of Classification Search
CPC .............. H04B 10/0779; H04B 10/40; H04B 10/0777; H04B 10/0775; H04B 10/0773;
(Continued)

(56) References Cited

U.S. PATENT DOCUMENTS

| 5,272,723 A | 12/1993 | Kimoto |
| 5,397,981 A | 3/1995 | Wiggers |

(Continued)

FOREIGN PATENT DOCUMENTS

| CN | 107342810 | 11/2019 |
| EP | 2743710 | 9/2018 |

(Continued)

OTHER PUBLICATIONS

Varughese, Siddarth, et al., Accelerating Assessments of Optical Components Using Machine Learning: TDECQ as Demonstrated Example, Journal of Lightwave Technology, Jan. 1, 2021, pp. 64-72, vol. 39, No. 1, IEEE.

(Continued)

*Primary Examiner* — Hibret A Woldekidan
(74) *Attorney, Agent, or Firm* — Miller Nash LLP; Andrew J. Harrington

(57) ABSTRACT

A test and measurement system includes a test and measurement device, a connection to allow the test and measurement device to connect to an optical transceiver, and one or more processors, configured to execute code that causes the one or more processors to: set operating parameters for the optical transceiver to reference operating parameters; acquire a waveform from the optical transceiver; repeatedly execute the code to cause the one or more processors to set operating parameters and acquire a waveform, for each of a predetermined number of sets of reference operating parameters; build one or more tensors from the acquired waveforms; send the one or more tensors to a machine learning system to obtain a set of predicted operating parameters; set the operating parameters for the optical transceiver to the predicted operating parameters; and test the optical transceiver using the predicted operating parameters.

20 Claims, 7 Drawing Sheets

(58) Field of Classification Search
CPC ...... H04B 10/43; H04B 10/50; H04B 10/501;
H04B 10/07955; H04B 10/0799; H04B
10/0793; H04B 10/0795; H04B 10/07951;
H04B 10/0753; H04B 10/07957; H04B
10/503; H04B 10/0771; H04B 10/0731;
H04B 10/07; H04B 10/073; H04B
10/075; H04B 10/077; G06F 18/214;
G06N 20/00; G06N 3/08; G06N 3/02;
G02B 6/42

See application file for complete search history.

(56) References Cited

U.S. PATENT DOCUMENTS

| | | | |
|---|---|---|---|
| 5,594,655 A | 1/1997 | Berchin | |
| 7,181,146 B1 | 2/2007 | Yorks | |
| 7,298,463 B2 | 11/2007 | French | |
| 8,583,395 B2 | 11/2013 | Dybsetter | |
| 8,861,578 B1 | 10/2014 | Lusted | |
| 9,059,803 B2 | 6/2015 | Detofsky | |
| 9,337,993 B1 | 5/2016 | Lugthart | |
| 9,548,858 B1 | 1/2017 | Cirit | |
| 9,699,009 B1 | 7/2017 | Ainspan | |
| 10,171,161 B1 | 1/2019 | Cote | |
| 10,236,982 B1 | 3/2019 | Zhuge | |
| 10,270,527 B1 | 4/2019 | Mentovich | |
| 10,396,897 B1* | 8/2019 | Malave | H04B 10/07955 |
| 10,585,121 B2 | 3/2020 | Absher | |
| 10,727,973 B1 | 7/2020 | Kumar | |
| 10,852,323 B2 | 12/2020 | Schaefer | |
| 10,863,255 B2 | 12/2020 | Zhang | |
| 11,005,697 B2 | 5/2021 | Liston | |
| 11,040,169 B2 | 6/2021 | Jung | |
| 11,095,314 B2 | 8/2021 | Medard | |
| 11,177,986 B1 | 11/2021 | Ganesan | |
| 11,233,561 B1 | 1/2022 | O'Shea | |
| 11,237,190 B2 | 2/2022 | Rule | |
| 11,336,378 B2 | 5/2022 | Buttoni | |
| 11,388,081 B1 | 7/2022 | Sommers | |
| 11,476,967 B2 | 10/2022 | Geng | |
| 11,695,601 B2 | 7/2023 | Sudhakaran | |
| 2002/0063553 A1 | 5/2002 | Jungerman | |
| 2003/0053170 A1 | 3/2003 | Levinson | |
| 2003/0220753 A1 | 11/2003 | Pickerd | |
| 2004/0032889 A1 | 2/2004 | Hikada | |
| 2004/0121733 A1* | 6/2004 | Peng | G01M 11/332 455/66.1 |
| 2004/0131365 A1 | 7/2004 | Lee | |
| 2004/0136422 A1 | 7/2004 | Mahowald | |
| 2004/0165622 A1 | 8/2004 | Lu | |
| 2004/0236527 A1 | 11/2004 | Felps | |
| 2005/0222789 A1 | 10/2005 | West | |
| 2005/0246601 A1 | 11/2005 | Waschura | |
| 2005/0249252 A1 | 11/2005 | Sanchez | |
| 2006/0120720 A1 | 6/2006 | Hauenschild | |
| 2008/0126001 A1 | 5/2008 | Murray | |
| 2008/0159737 A1 | 7/2008 | Noble | |
| 2008/0212979 A1 | 9/2008 | Ota | |
| 2009/0040335 A1 | 2/2009 | Ito | |
| 2011/0085793 A1 | 4/2011 | Oomori | |
| 2011/0161738 A1 | 6/2011 | Zhang | |
| 2011/0286506 A1 | 11/2011 | Libby | |
| 2013/0046805 A1 | 2/2013 | Smith | |
| 2014/0093233 A1* | 4/2014 | Gao | H04B 10/0799 398/16 |
| 2014/0343883 A1 | 11/2014 | Libby | |
| 2015/0003505 A1 | 1/2015 | Lusted | |
| 2015/0055694 A1 | 2/2015 | Juenemann | |
| 2015/0207574 A1 | 7/2015 | Schoen | |
| 2016/0191168 A1 | 6/2016 | Huang | |
| 2016/0328501 A1 | 11/2016 | Chase | |
| 2018/0006721 A1 | 1/2018 | Ishizaka | |
| 2018/0074096 A1 | 3/2018 | Absher | |
| 2018/0204117 A1 | 7/2018 | Brevdo | |
| 2018/0356655 A1* | 12/2018 | Welch | H04B 10/50595 |
| 2019/0038387 A1 | 2/2019 | Chu | |
| 2019/0278500 A1 | 9/2019 | Lakshmi | |
| 2019/0332941 A1 | 10/2019 | Towal | |
| 2019/0370158 A1 | 12/2019 | Rivoir | |
| 2019/0370631 A1 | 12/2019 | Fais | |
| 2020/0035665 A1 | 1/2020 | Chuang | |
| 2020/0057824 A1* | 2/2020 | Yeh | G06F 30/13 |
| 2020/0166546 A1 | 5/2020 | O'Brien | |
| 2020/0195353 A1 | 6/2020 | Ye | |
| 2020/0229206 A1 | 7/2020 | Badic | |
| 2020/0313999 A1 | 10/2020 | Lee | |
| 2020/0335029 A1 | 10/2020 | Gao | |
| 2021/0041499 A1 | 2/2021 | Ghosal | |
| 2021/0105548 A1 | 4/2021 | Ye | |
| 2021/0111794 A1 | 4/2021 | Huang | |
| 2021/0160109 A1 | 5/2021 | Seol | |
| 2021/0167864 A1 | 6/2021 | Razzell | |
| 2021/0314081 A1 | 10/2021 | Shattil | |
| 2021/0389373 A1 | 12/2021 | Pickerd | |
| 2021/0390456 A1 | 12/2021 | Pickerd | |
| 2022/0070040 A1 | 3/2022 | Namgoong | |
| 2022/0076715 A1 | 3/2022 | Lee | |
| 2022/0121388 A1 | 4/2022 | Woo | |
| 2022/0182139 A1 | 6/2022 | Zhang | |
| 2022/0199126 A1 | 6/2022 | Lee | |
| 2022/0200712 A1 | 6/2022 | Lillie | |
| 2022/0215865 A1 | 7/2022 | Woo | |
| 2022/0236326 A1 | 7/2022 | Schaefer | |
| 2022/0239371 A1 | 7/2022 | Xu | |
| 2022/0247648 A1 | 8/2022 | Pickerd | |
| 2022/0311513 A1 | 9/2022 | Pickerd | |
| 2022/0311514 A1* | 9/2022 | Smith | H04B 10/0777 |
| 2022/0334180 A1* | 10/2022 | Pickerd | G01R 13/0254 |
| 2022/0373597 A1 | 11/2022 | Agoston | |
| 2022/0373598 A1 | 11/2022 | Tan | |
| 2022/0385374 A1 | 12/2022 | Arikawa | |
| 2022/0390515 A1* | 12/2022 | Pickerd | G01R 31/318307 |
| 2022/0407595 A1 | 12/2022 | Varughese | |
| 2023/0050162 A1 | 2/2023 | Tan | |
| 2023/0050303 A1 | 2/2023 | Pickerd | |
| 2023/0052588 A1 | 2/2023 | Sudhakaran | |
| 2023/0088409 A1 | 3/2023 | Parsons | |
| 2023/0098379 A1* | 3/2023 | Smith | G06N 3/045 706/12 |
| 2023/0228803 A1 | 7/2023 | Sun | |

FOREIGN PATENT DOCUMENTS

| | | | |
|---|---|---|---|
| EP | 3936877 | 1/2022 | |
| JP | 6560793 | 8/2019 | |
| WO | 2021092156 | 5/2021 | |
| WO | WO-2021092156 A1 * | 5/2021 | H04B 10/0731 |
| WO | 2022171645 | 8/2022 | |
| WO | 2022189613 | 9/2022 | |

OTHER PUBLICATIONS

Varughese, Siddarth, et al., Accelerating TDECQ Assessments using Convolutional Neural Networks, OFC, Mar. 2020, 3 pages, The Optical Society (OSA).

Watts et al., "Performance of Single-Mode Fiber Links Using Electronic Feed-Forward and Decision Feedback Equalizers", 2005, IEEE Photonics Techology Letters, vol. 17, No. 10, pp. 2206-2208 (Year: 2005).

Echeverri-Chacon et al., "Transmitter and Dispersion Eye Closure Quaternary (TDECQ) and Its Sensitivity to Impairments in PAM4 Waveforms", 2019, Journal of Lightwave Technology, vol. 37, No. 3, pp. 852-860 (Year: 2019).

Wang et al., "Intelligent Constellation Diagram Analyzer Using Convolutional Neural Network-Based Deep Learning," Optics Express, Jul. 24, 2017, vol. 25, No. 15.

* cited by examiner

OPTICAL TRANSMITTER TUNING USING MACHINE LEARNING AND REFERENCE PARAMETERS

RELATED APPLICATIONS

This disclosure claims benefit of U.S. Provisional Patent Application No. 63/165,698, titled, "OPTICAL TRANSMITTER TUNING USING MACHINE LEARNING," filed Mar. 24, 2021, and U.S. Provisional Patent Application No. 63/272,998, titled "OPTICAL TRANSMITTER TUNING USING MACHINE LEARNING AND REFERENCE PARAMETERS," filed Oct. 28, 2021, which are incorporated herein in their entirety.

TECHNICAL FIELD

This disclosure relates to test and measurement systems, more particularly to systems and methods for tuning parameters of a device under test, for example an optical transceiver device.

BACKGROUND

Manufacturers of optical transmitters test their transmitters by tuning them to ensure they operate correctly. Each transmitter can take up to two hours as a worst case example. Tuning typically takes the form of sweeping the turning parameters, meaning that the transmitter tunes at each level of each parameter. In the worst case example, it may take up to 200 iterations and three to five iterations in the best case. Speeding up this process to reduce the number of iterations to get the transceiver tuned reduces both the time and therefore, the expense, of manufacturing.

Embodiments of the disclosed apparatus and methods address shortcomings in the prior art.

DETAILED DESCRIPTION

Currently, optical transceiver tuning does not employ any type of machine learning to decrease the time needed to tune and test the transceivers. The amount of time it takes to train them increases the overall costs of the transceivers. The use of a machine learning process can decrease the amount of time needed to tune, test and determine if a part passes or fails. The embodiments here use one or more neural networks to obtain the tuning parameters for optical transceivers to allow a determination of whether the transceiver operates correctly more quickly than current processes.

Figure 1:
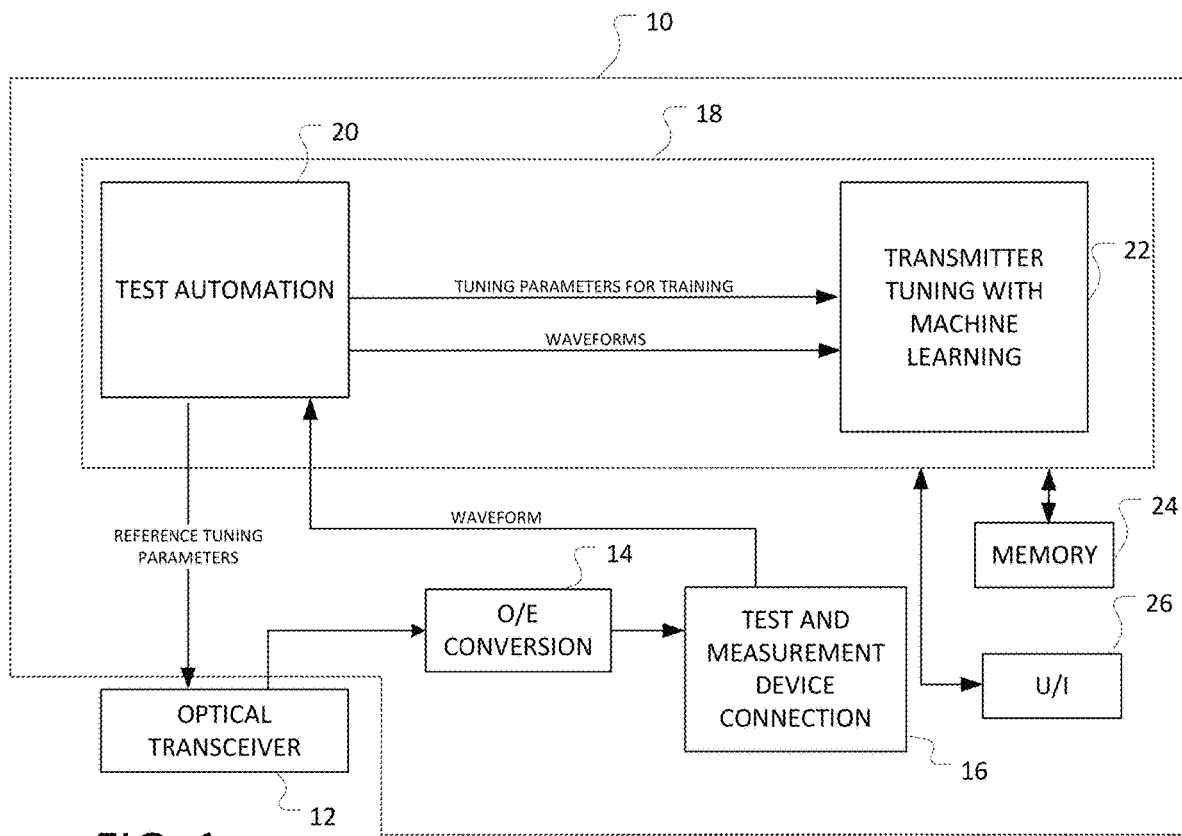
FIG. 1 and FIG. 2 show embodiments of a test and measurement system.

FIG. 1 shows an embodiment of a test and measurement system or device that uses a machine learning system to determine operating parameters for the parts. The output measurements for which the user may tune, and will be used to measure the operation, may include transmitter dispersion eye closure penalty quaternary (TDECQ), extinction ratio, average optical power, optical modulation amplitude, level separation mismatch ratio, among others. The tuning parameters referred to in this discussion comprise the settings loaded into the transceiver to achieve the desired results. These parameters vary widely depending upon the nature of the optical transceivers and the way they operate. They may include values of voltage, current, frequency, modulation, etc.

The test and measurement device 10 may include many different components. FIG. 1 shows one possible embodiment and may include more or fewer components. The device of FIG. 1 connects to the DUT, in this case an optical transceiver 12. The test and measurement device, such as an oscilloscope, may include an optical/electrical (O/E) conversion module 14 that connects to the test and measurement device through a connection such as 16. The processor 18 represents one or more processors and will be configured to execute code to cause the processor to perform various tasks. FIG. 1 shows the machine learning system 22 as part of the test and measurement device. The machine learning system may reside on a separate device such as a computer in communication with the test and measurement device. Similarly, the test automation code 20 executed by a processor may reside in a manufacturing device to which the processor 18 is connected.

For purposes of this discussion, the term "test and measurement device" as used here includes those embodiments that include an external computing device as part of the test and measurement device. The memory 24 may reside on the test and measurement device or be distributed between the test and measurement device and the computing device. As will be discussed in more detail later, the memory may contain training data and run-time data used by the machine learning system. The test and measurement device may also include a user interface 26 that may comprise one or more of a touch screen, video screen, knobs, buttons, lights, keyboard, mouse, etc.

FIG. 1 shows an embodiment of the system during training. In training, the optical transceiver 12 connects to the test and measurement device through the 0/E converter 14 and the connection 16. A test automation process 20 sends the transceiver tuning parameters to the transceiver, which may be referred to as "loading" the transceiver in a process discussed in more detail further. The test automation process 20 operates to create training tuning parameters and sends those to the machine learning system 22. The tuning parameters used for training may be based upon, for example, average parameters developed through historical testing using conventional testing methods. The test and measurement device acquires a waveform from the transceiver DUT operating with the loaded tuning parameters, and returns the acquired waveform to the processor. The system may perform measurements on the waveform, and sends the waveform to the machine learning system 22.

Figure 2:
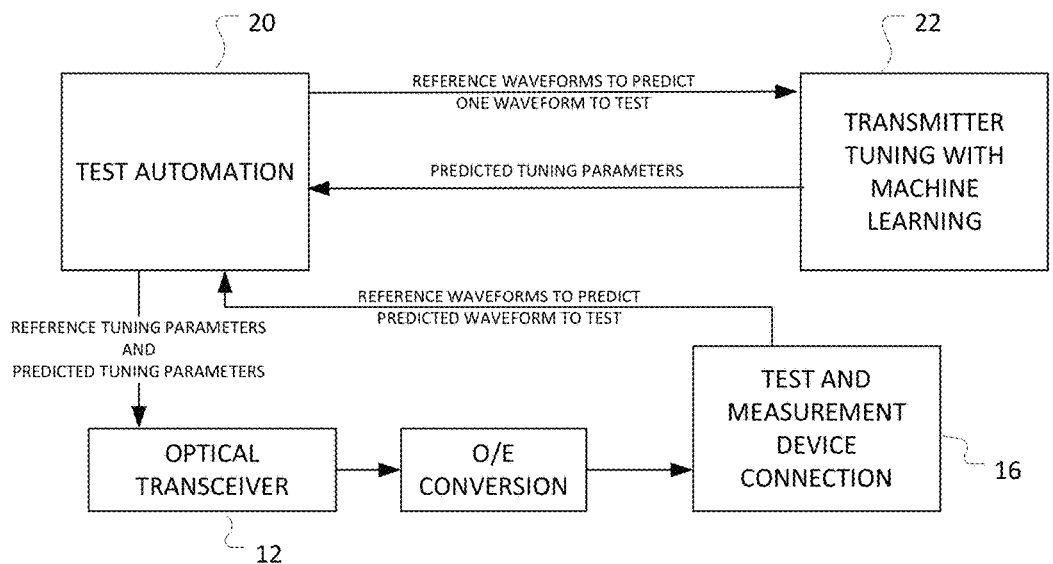

FIG. 2 shows a portion of an embodiment of the system during operation. In a first part of the process the test automation process 20 generates reference tuning parameters and loads them into the transceiver 12. The test and measurement device acquires and returns a set of reference waveforms from the transceiver that the machine learning system will use to predict the optimized turning parameters.

The machine learning system then returns the predicting tuning parameters, also referred to as the optimized parameters. The test automation system then loads those predicted parameters into the transceiver. The test and measurement device acquires a newly generated waveform from the transceiver operating with the predicted parameters, referred to here as the predicted waveform, and passes that waveform back to the test automation process to determine if the transceiver passes or fails. This waveform may also pass back to the machine learning system as feedback on the training.

In the discussion here, the term "reference," either parameters or waveform, refers to the set of waveforms generated by the test automation process and used in both training and in run-time operation of the machine learning system. The term "predicted" refers to the output of the machine learning system. The term "optimized" refers to tuning parameters that result from an optimization process from the test automation or the machine learning system.

The below discussion uses waveforms acquired from the transceiver in the test automation process. The embodiments below use three waveforms for non-linear transceivers. No limitation to any particular number of waveforms is intended, nor should any be implied.

Figure 3:
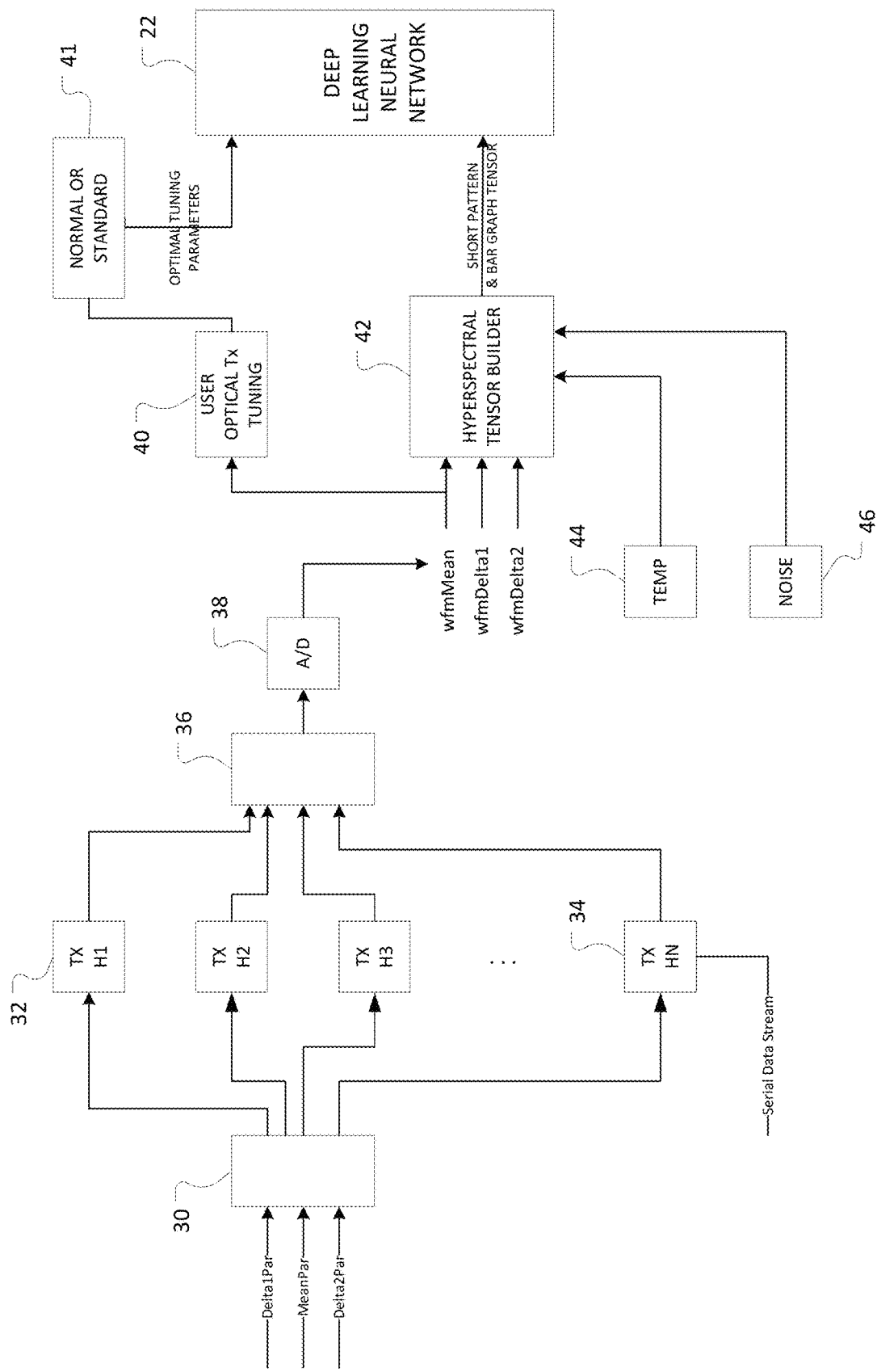
FIG. 3 shows an embodiment of a training process for an optical transmitter tuning system.

FIG. 3 shows a block diagram of an embodiment for a training system for an optical transceiver tuning system using machine learning. The manufacture test automation system measures a quantity of optical transceivers, Tx. The test automation system optimally tunes them using the "standard" or conventional manufacturer tuning process. For training, many example TX units must be measured and optimally tuned to provide data for training. The number of units needs to be sufficient to provide a good distribution for the DUT optimal parameters histogram. Each TX unit is tested in serial fashion, one at a time, as shown by the input serial data stream into Tx 34 that is provided to each Tx.

A histogram for each tuning parameter for each device for each temperature for optimal tuning is created. This is then used to develop an average parameter set. One should note that the process does not have to use an average, or mean, set of parameters, but for ease of discussion and understand this discussion will use that. The user or system could then produce two variations of the mean parameter set, MeanPar, for example by adding to the mean parameters to produce Delta1Par set, and subtracting from the mean parameters to produce Delta2Par set.

The MeanPar set, and the Delta1Par and Delta2Par parameter sets are then used as reference parameters for training and for runtime of the system. The objective is to provide three sample points on the parameters' non-linear characteristics curves so that the neural network has enough data to accurately predict the optimal parameter set by looking at the processed waveforms from these reference parameter settings. The number of reference parameter sets may be from 1 to N where N is limited by compute time and resources. In one example, 200 transceivers undergo testing of five acquisitions with these three parameters sets, resulting in 15 waveforms for every transceiver, totaling 3000 waveforms for training. In FIG. 3, the switch 30 does not comprise a hardware switch but is a logic block that causes each parameter set to be loaded into each transceiver 32 through 34, where again N is only limited by time and resources.

The resulting waveforms are then processed in sequence, represented by switch 36 followed by a digitizer 38. A waveform for each set of reference parameters is stored in memory, such as that shown in FIG. 1. This requires three acquisitions thru the A/D, using a different reference parameter set for each acquisition. The test automation application controls the system temperature associated with a particular set of tuning parameters. In this example, the temperature associated with each set of parameters is provided at 44, as is an instrument noise profile at 46. This temperature is input to the hyperspectral tensor builder 42 and incorporated into the tensor images used for training and run time. Temperature may be shown as a bar graph in the images. However, it may alternatively be represented as pie graph or some other form if desired.

As discussed above the test automation process 20 will use the "standard" tuning process that is to be replaced with the faster machine learning process of the embodiments. The optimal tuning parameters used in training may undergo normalization or standardization depending upon the data at 41. The normalization or standardization rescales the tuning parameter values to fit within a normalized range for the neural network 22 to handle well. In one embodiment, the normalization would be to rescale the tuning parameter to fall with values of 0 to 1, or to center it zero in a range of −1 to 1. One embodiment of a formula for normalization is $y=(x-min)/(max-min)$, where y is the normalized value and x is the original value. If the system uses a pretrained network that does not have built in normalization, it would use this normalization.

The user algorithm 40 tunes each of the Tx device samples for optimal tuning parameters which are then used to train the network to associate the optimal tuning parameters with a given waveform shape and characteristics such as temperature and scope noise. This association is always done using the same input reference tuning parameters stored in the Tx DUT during waveform acquisition.

The hyperspectral tensor building may use a short pattern tensor building process for machine learning. The builder 42 uses the decoded pattern and the input waveform to search down the record length and look for pre specified patterns which may be defined from a unit interval in the machine learning system or may be hidden from the user depending on the application. Several different patterns may be used. For optical tuning, the system may use a short pattern of each level with no transitions for five single unit intervals are used to view the PAM4 levels by the machine. This allows the machine to recognize the Tx levels parameters settings more readily.

For recognizing FFE taps of the TX parameter settings, impulse response code sequences, i.e. short patterns, are pulled out and placed into the images input to the neural network 22. The term hyperspectral is used in the sense that the image input to deep learning neural network 22 has three color channels labeled as R, G, and B (red, green and blue). The waveforms making up these hyperspectral images are not actually in these colors, but rather the system uses the three color channels to incorporate the different images created by tensor builder. The system collects three waveforms and each of the images from each of the three waveforms goes into one of the color channels. For example, without limitation, the wfinMean that results from the MeanPar data set may be on the Red channel, wfinDelta1 from the Delta1Par set on the Blue channel, and wfinDelta2 from the Delta2Par set on the Green channel. No limitation to these channels exists. Additional color channels in addition to RGB may be incorporated if desired. The pretrained deep learning networks used here only have the three color channels, but more channels could result from a custom deep learning network, or multiple pretrained three-color channel networks.

As will be discussed in more detail further, the discussion here shows two instances of tensor builders. One creates images used for training the optimal parameter network. The other may be used for tuning a network that outputs TDECQ (transmitter dispersion eye closure quaternary), and optimized FFE (feed-forward equalization) filter taps. In summary, the machine learning system is trained to receive waveform tensor images and output a set of optimized transmitter parameters, and may also output a set of optimized FFE taps and TDECQ.

Figure 4:
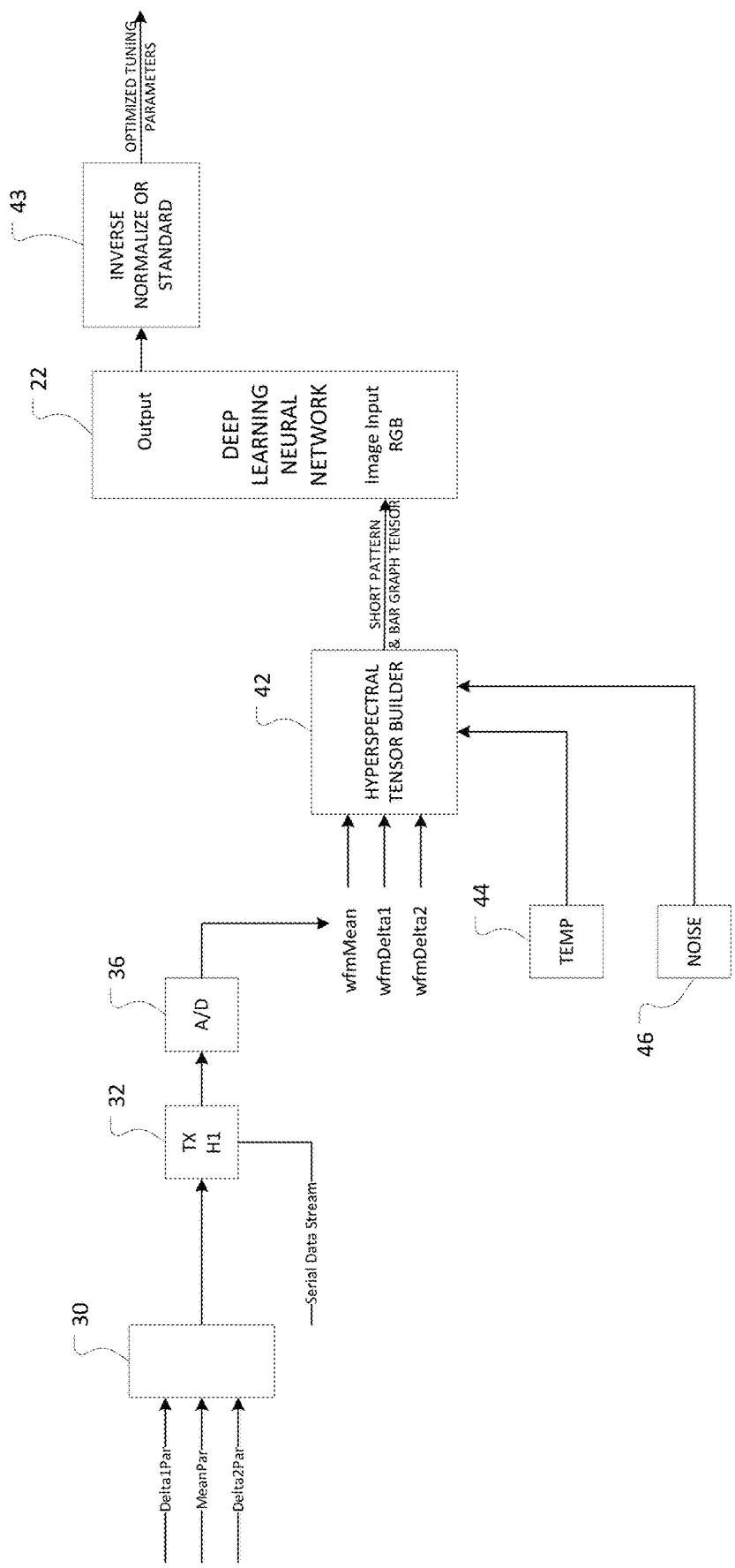
FIG. 4 shows an embodiment of a run-time process for an optical transmitter tuning system.

FIG. 4 shows a block diagram of an embodiment of a run-time system for an optical transceiver tuning system using machine learning. During run time, the user's automation test application will switch in three different reference sets of tuning parameters to a single transceiver undergoing testing such as 32 and acquire a waveform for each one, represented by switch 30. The TDECQ analysis, shown as 90 in FIG. 6, will resample waveforms, decode the pattern, and align the pattern and the waveform. It will not compute TDECQ during runtime. TDECQ and FFE taps will be output from the second trained deep learning network, shown at 100 in FIG. 6. The hyperspectral tensor builder 42 blocks will create the same kind of tensor images including bar graphs that were created during training. These tensor images will be inputs to the trained deep learning neural network 22. The outputs of the trained deep learning neural network 22 are optimal tuning parameters, TDECQ, and optimized FFE taps. The system then applies an inverse normalization or standardization block 43 to obtain the desired values out of the neural net output.

Figure 5:
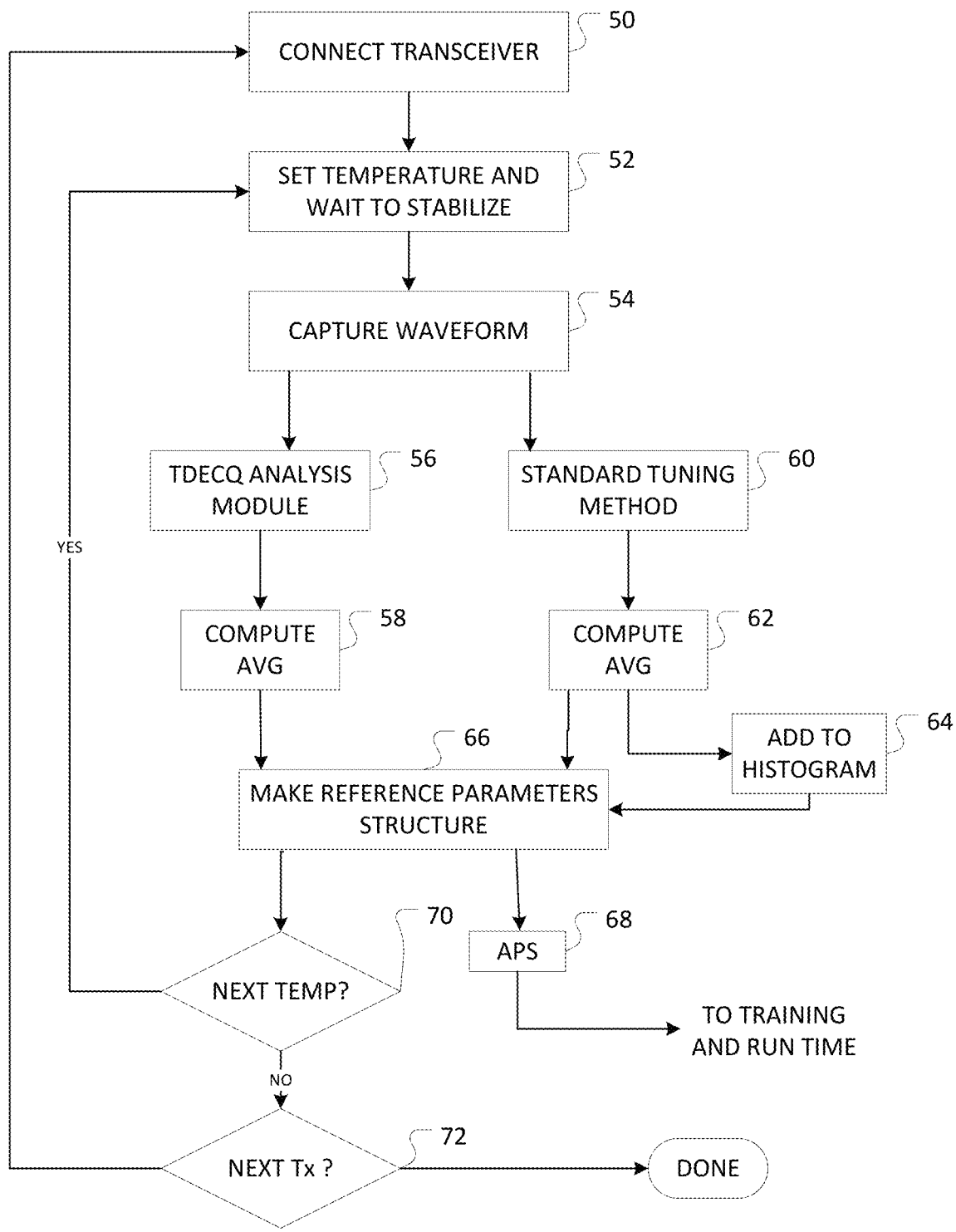
FIG. 5 shows a flowchart of an embodiment of a method to obtain a population of tuning parameters.

FIG. 5 shows an embodiment of a method to obtain a histogram of optimized tuning parameters to be used in the training and run-time processes. This process uses the conventional "standard" tuning method to generate the histogram and average values used to create an average parameters structure (APS). The manufacturer connects the transceiver to the test and measurement system at 50, then sets the temperature and waits for it to stabilize at 52. The waveform from the transceiver is then acquired at 54. The TDECQ analysis at 56 then allows the system to compute an average at 58. Similarly, the standard tuning method at 60 will result in tuning parameters for each transceiver that can be averaged at 62. This also allows the building of a histogram used in training at 64. All of this information creates an average parameters structure (APS) at 66, discussed in more detail with regard to FIG. 6, which is sent to the training and run-time processes at 68.

The process then loops as many times as necessary. For each transceiver, the temperature changes until the transceiver has completed tests for the desired temperature range at 70. The process then moves onto the next transceiver at 72 until a sufficient number have been completed to ensure a high enough level of accuracy.

Figure 6:
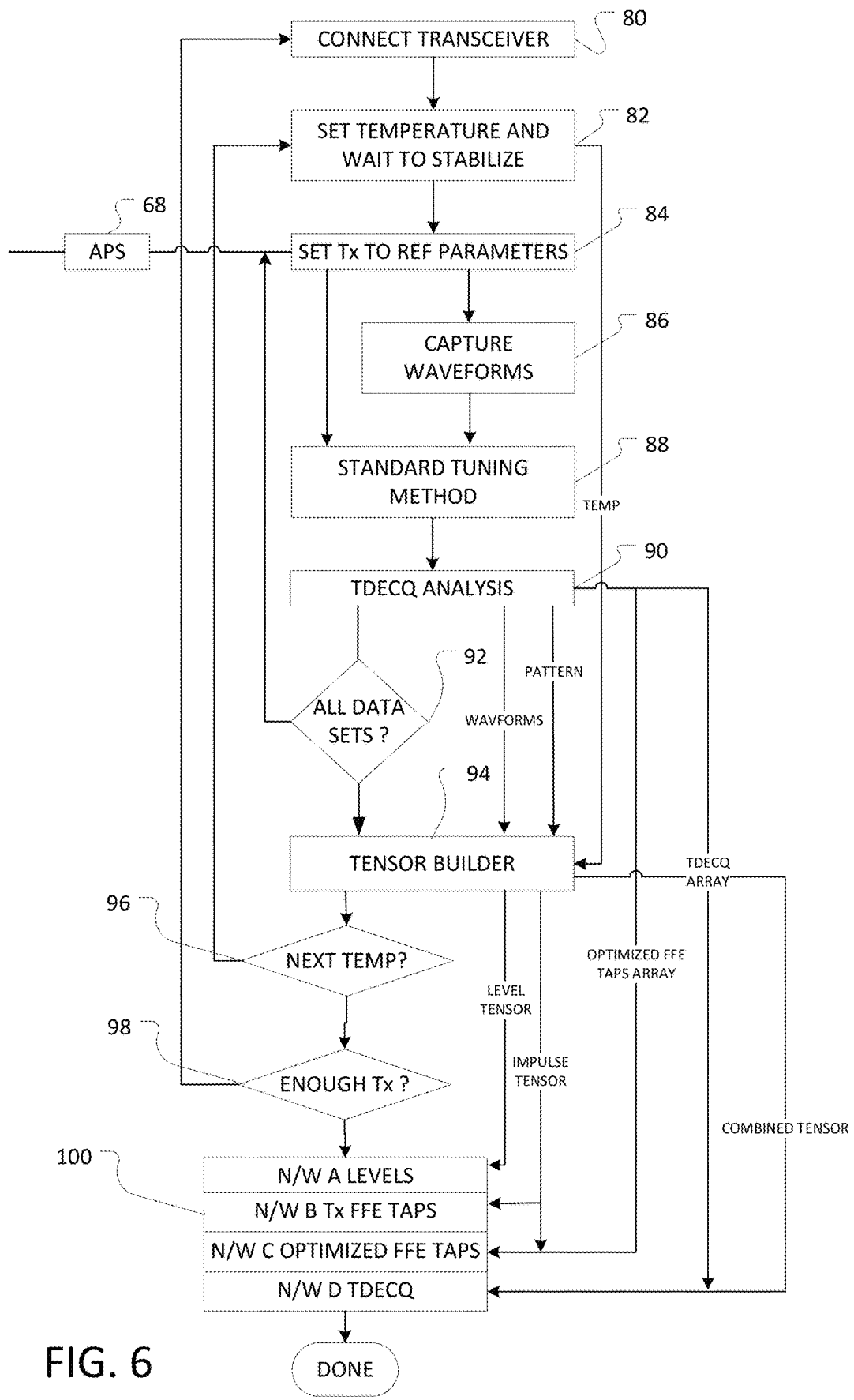
FIG. 6 shows a flowchart of an embodiment of a method to train a neural network to obtain optimized tuning parameters for optical transceivers.

FIG. 6 shows a flowchart of an embodiment of training a machine learning system to prepare it for performing run-time predictions of optimized transceiver parameters. The user connects the transceiver to the test and measurement system at 80, sets the temperature and waits for it to stabilize at 82. At 84, the transceiver is loaded with one of the reference parameter sets in the average parameter structure (APS) 68 from FIG. 5. The transceiver then operates and the test and measurement system captures, that is acquires, the waveform at 86. The user then performs the standard tuning method at 88, and the system performs TDECQ analysis module at 90. This repeats as noted at 92 until all three reference parameter sets have been run. The TDECQ analysis module then sends the waveforms and patterns for all the reference sets to the tensor builder at 94. The TDECQ module resamples the waveforms, decodes the pattern and aligns the pattern and the waveforms prior to sending those to the tensor builder. There is only one pattern in this embodiment because it is the same for all the waveforms that are processed for training and for run-time.

The tensor builder then produces several outputs and sends them to the neural network, which may comprise multiple sub-networks within the machine learning system. The tensor builder sends a level tensor to a first neural net, identified as neural network A, an impulse tensor to the transceiver FFE taps neural network B, the impulse tensor to the optimized FFE taps neural network C, along with the optimized FFE taps array from the TDECQ module, and a combined tensor to the neural network D for the TDECQ results. This continues until the current transceiver cycles through all of the temperatures at 96, and then repeats for all of the transceivers at 98, until enough have been processed, at which point the training process ends. A determination as to whether enough transceivers have been processed may involve testing the machine learning system to determine its accuracy.

Figure 8:
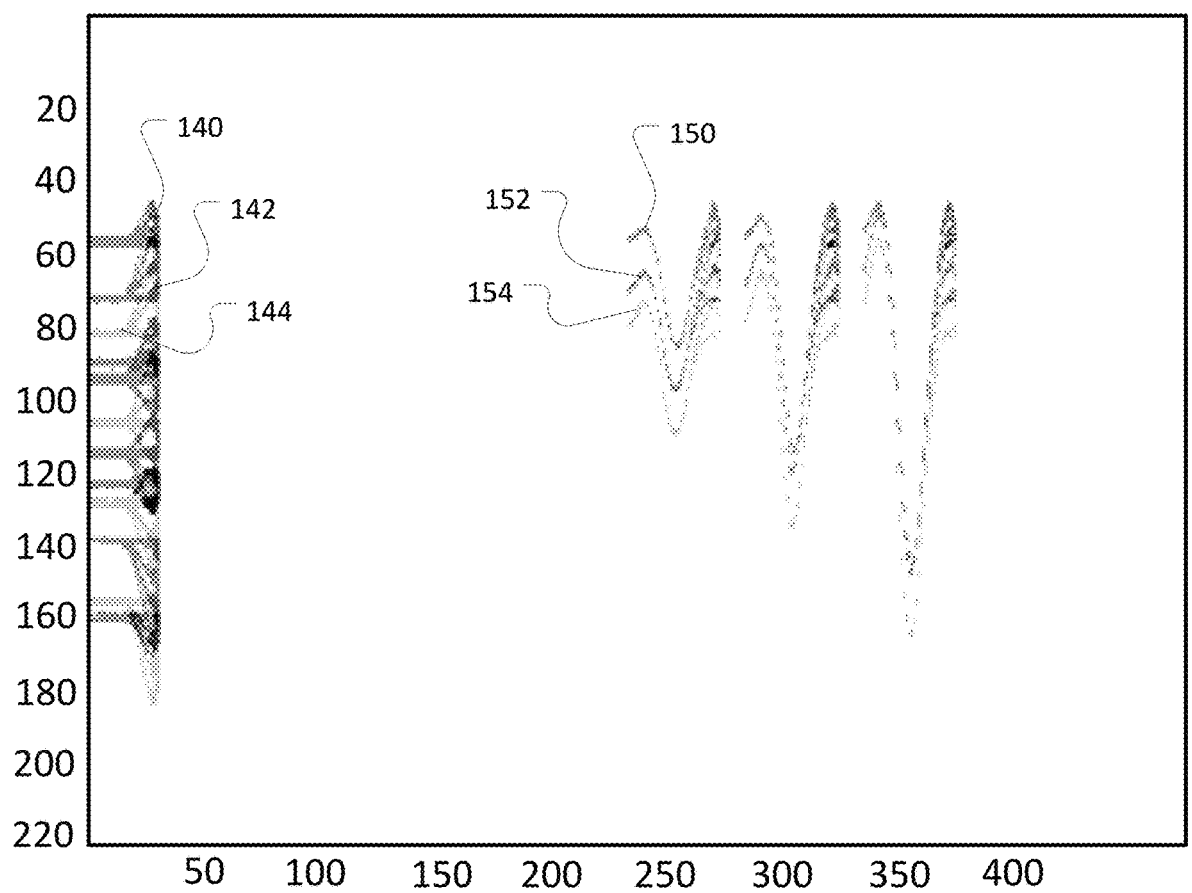
FIG. 8 shows examples of waveforms and tensor images.

FIG. 8 shows examples of the original 4-level pulse amplitude modulation (PAM4) images from the waveforms, and the resulting tensors. As discussed above, this embodiment uses three channels. FIG. 8 shows the input waveforms on the left, with the three channels showing the input waveforms on the Red channel 140, Blue 142 and Green 144. The tensor 150 and the tensors in the same position across the figure correspond to the Red channel, the position of tensor 152 corresponds to the Blue channel, and the position of tensor 154 corresponds to the Green channel.

Figure 7:
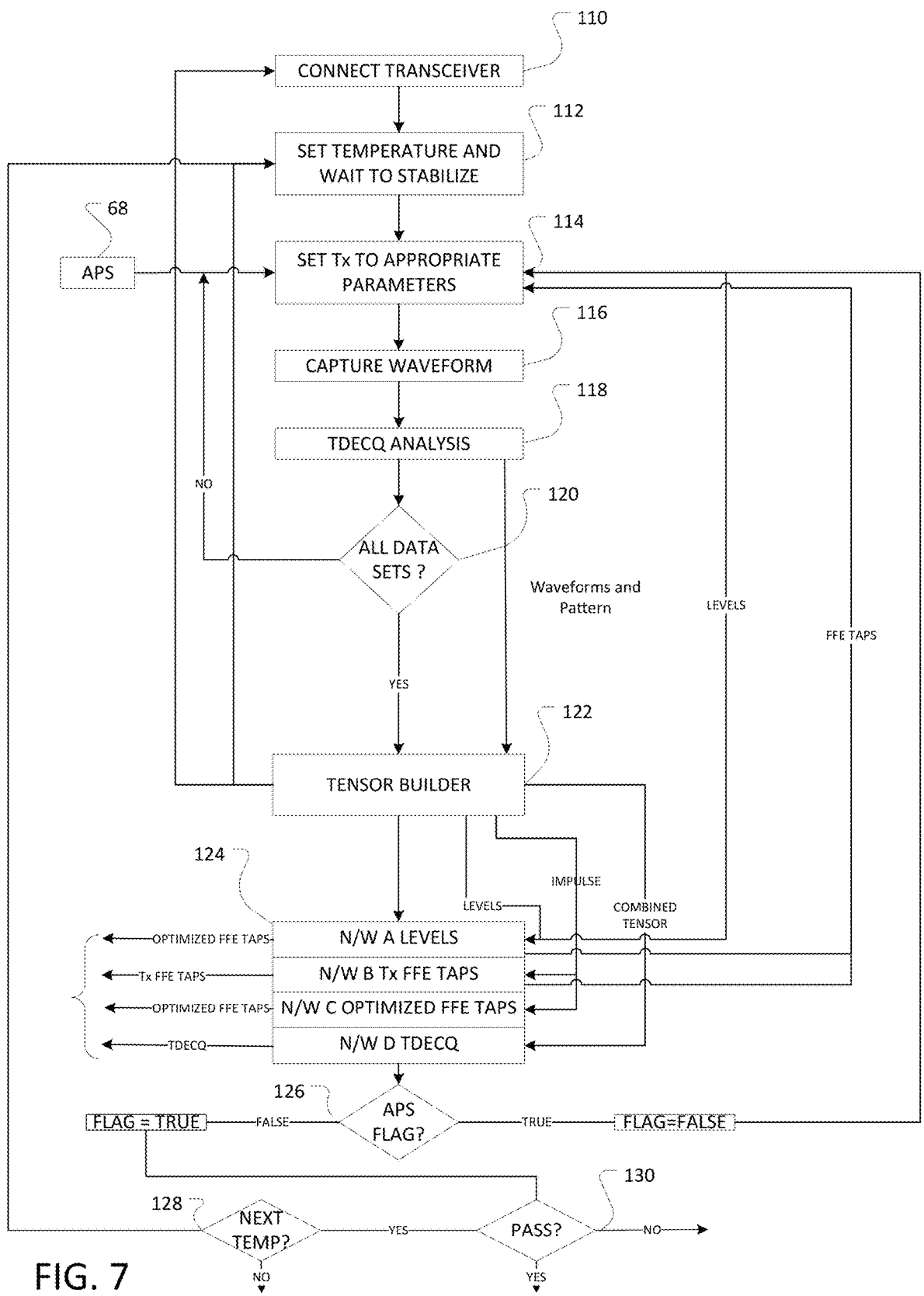
FIG. 7 shows a flowchart of an embodiment of a method to use a neural network to obtain optimized turning parameters for optical transceivers.

Once trained and validated, the machine learning system will operate at run-time. FIG. 7 shows a flowchart of an embodiment of this process. The user connects the transceiver at 110, sets the temperature and waits for it to stabilize at 112. The reference parameters contained in the average parameter structure 68 are loaded into the transceiver at 114 as the appropriate parameters for this part of the process. As will be discussed in more detail, the appropriate parameters may change depending upon where the transceiver is in its cycle.

The process continues similar to the training cycle by capturing or acquiring the waveform at 116 and performing the TDECQ analysis at 118. At 120, the system checks if the transceiver has undergone the process for all three of the reference parameter sets. Once all three reference sets have completed, the three waveforms and the decoded pattern are sent to the tensor builder at 122. The tensor builder creates a tensor image for all three waveforms, and combines them all into a RGB image, as previously discussed. Similar to the training process, the tensor builder sends the levels tensor, the impulse tensor and the combined tensor image to the neural network 124. During run-time, however, the neural network(s)/machine learning system produces the optimized FFE taps, and TDECQ information to provide a predicted, optimized set of tuning parameters for the transceiver.

After the predictions are made, the APS flag is set to false at 126. When the process returns to 114 to set the transceiver to the appropriate parameters, the appropriate parameters are now the predicted tuning parameters. This also indicates that the system should only acquire one waveform, and only one tensor image is generated, and the neural network D produces a single TDECQ value. The APS flag remains false at 126, so the value is checked at 130 and the transceiver either passes or fails. If it passes, then the next temperature is selected at 128 if any still need to be tested, or the process ends.

In this manner, more than one neural network has been trained within the overall neural network/machine learning system. Two networks predict optimal transmitter tuning parameters, one, network C, is used to predict the FFE taps, and D is used to predict a TDECQ measurement.

The system uses the TDECQ measurement during training as input to network D so that network D associates an input waveform with a TDECQ value. Similarly, the optimized FFE taps out of the TDECQ module were used during training for the C network so that the C network associates waveforms with optimized tap values. Both Networks A and B provided tuning parameters to associate with three reference waveforms. Network A provided levels and gain type parameters. Network B associated FFE tuning parameters. The transmitter has FFE built into it and so the taps of the FFE filter are tuning parameters.

The optimized FFE taps out of the TDECQ module are different. They are not tuning parameters for the TX but they represent what one would have set an FFE to in order to open up the eye as much as possible in order to make the TDECQ measurement. Those FFE taps are applied to the waveform prior to making the TDECQ measurement.

While the embodiments described above are discussed using the example application of optical transceiver tuning processes, embodiments of the disclosure may be used in any process involving adjustment of operating parameters of any type of device under test, and may be especially useful to improve processes involving iterative adjustment of operating parameters to achieve a desired performance measurement of the DUT or to achieve a passing test result for the DUT.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

EXAMPLES

Illustrative examples of the disclosed technologies are provided below. An embodiment of the technologies may include one or more, and any combination of, the examples described below.

Example 1 is a test and measurement system, comprising: a test and measurement device; a connection to allow the test and measurement device to connect to an optical transceiver; and one or more processors, configured to execute code that causes the one or more processors to: set operating parameters for the optical transceiver to reference operating parameters; acquire a waveform from the optical transceiver; repeatedly execute the code to cause the one or more processors to set operating parameters and acquire a waveform, for each of a predetermined number of sets of reference operating parameters; build one or more tensors from the acquired waveforms; send the one or more tensors to a machine learning system to obtain a set of predicted operating parameters; set the operating parameters for the optical transceiver to the predicted operating parameters; and test the optical transceiver using the predicted operating parameters.

Example 2 is the test and measurement system of Example 1, wherein the one or more processors are further configured to cause the one or more processors to repeat the execution of the code for each temperature setting in a range of temperatures settings.

Example 3 is the test and measurement system of Examples 1 or 2, wherein the one or more processors are distributed among the test and measurement device, a test automation system and a machine learning system separate from the test and measurement device.

Example 4 is the test and measurement system of any of Examples 1 through 3, wherein the machine learning system comprises a plurality of neural networks, one or more to produce the predicting operating parameters, one to produce a predicted measurement value, and one to produce a set of optimized feed-forward equalization filter tap values.

Example 5 is the test and measurement system of any of Examples 1 through 4, wherein the predetermined number of sets of reference parameters is three, one set of average values for the parameters, one set having values higher than the average values, and one set having values lower than the average values.

Example 6 is the test and measurement system of any of Examples 1 through 5, wherein the one or more processors are further configured to execute code to cause the one or more processors to apply an inverse normalization to the predicted operating parameters.

Example 7 is a method to tune optical transceivers, comprising: connecting the optical transceiver to a test and measurement device; setting operating parameters for tuning the transceiver to reference operating parameters; acquiring a waveform from the optical transceiver; repeating the setting operating parameters and acquiring a waveform, for each of a predetermined number of sets of reference operating parameters; building one or more tensors from the acquired waveforms; sending the one or more tensors to a machine learning system to obtain a set of predicted operating parameters; setting the operating parameters for tuning the optical transceiver to the predicted operating parameters; and validating the predicted operating parameters.

Example 8 is the method of Example 7, further comprising repeating the method for each temperature in a range of temperatures.

Example 9 is the method of Examples 7 or 8, wherein building one or more tensors comprises building a levels tensor, an impulse tensor, and a combined tensor.

Example 10 is the method of any of Examples 7 through 9, wherein building a combined tensor comprises building an image having three or more channels.

Example 11 is the method of Example 10, wherein the image includes a bar graph image representing at least one of a temperature value and a noise value.

Example 12 is the method of any of Examples 7 through 11, further comprising generating reference operating parameters, comprising: tuning a plurality of optical transceivers at a plurality of temperatures; generating a histogram of each tuning parameter, at each temperature, for the plurality of tuned optical transceivers; calculating a mean reference parameter set by averaging values for each parameter in the histograms; increasing values in the mean parameter set to create a first delta reference parameter set; and decreasing values in the mean parameter set to create a second delta reference parameter set.

Example 13 is the method as any of Examples 7 through 13, wherein building one or more tensors comprises building a tensor having three channels, one channel for a mean reference tensor, one channel for a first delta tensor, and one channel for a second delta tensor.

Example 14 is the method of any of Examples 7 through 13, wherein sending the one or more tensors to a machine learning system comprises: sending the one or more tensors to two neural networks in the machine learning system to obtain optimized operating parameters; sending an impulse tensor to a third neural network to obtain optimized feed-forward equalization filter taps; and sending a combined tensor to a fourth neural network to obtain a predicted transmitter and dispersion eye closure penalty quaternary (TDECQ) measurement.

Example 15 is the method of any of Examples 7 through 14, wherein validating the predicted operating parameters comprises measuring the output of the transceiver and determining if the output is within a predetermined range.

Example 16 is the method of any of Examples 7 through 15, further comprising applying an inverse normalization to the predicted operating parameters.

Example 17 is a method of training a machine learning system for tuning optical transceivers, comprising: creating a predetermined number of sets of reference operating parameters; repeating, for each set of reference operating parameters: setting the operating parameters for the optical transceiver to a set of reference operating parameters; acquiring a waveform from the optical transceiver; tuning the optical transceiver to meet a desired output; and performing transmitter dispersion eye closure quaternary (TDECQ) analysis on the waveform; providing results of the analysis and the waveforms to a tensor builder; sending one or more tensors to one or more neural networks with the associated waveforms and reference operating parameters; and repeating the method until a sufficient number of transmitters have been tuned.

Example 18 is the method of Example 17, wherein creating the predetermined number of sets of reference operating parameters comprises: tuning a plurality of optical transceivers at a plurality of temperatures; generating a histogram of each parameter, at each temperature, for the plurality of tuned optical transceivers; calculating a mean reference parameter set by averaging values for each parameter in the histograms; increasing values in the mean parameter set to create a first delta reference parameter set; and decreasing values in the mean parameter set to create a second delta reference parameter set.

Example 19 is the method of Examples 17 or 18, further comprising normalizing the reference parameters.

Example 20 is the method of any of Examples 17 through 19, wherein the one or more neural networks comprise one or more neural networks for levels, one network for providing values for feed-forward equalization filters, and one network for a time dispersion eye closure quaternary value.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A test and measurement system, comprising:
a test and measurement device;
a connection to allow the test and measurement device to connect to an optical transceiver; and
one or more processors, configured to execute code that causes the one or more processors to:
set operating parameters for the optical transceiver to reference operating parameters by sending the reference operating parameters to the optical transceiver;
acquire a waveform from the optical transceiver;
repeatedly execute the code to cause the one or more processors to set operating parameters and acquire a waveform, for each of a predetermined number of sets of reference operating parameters;
build one or more tensors from the acquired waveforms;
send the one or more tensors to a machine learning system to obtain a set of predicted operating parameters;
set the operating parameters for the optical transceiver to the predicted operating parameters by sending the predicted operating parameters to the optical transceiver; and
test the optical transceiver using the predicted operating parameters by receiving a waveform from the optical transceiver to determine whether the optical transceiver passes or fails.

2. The test and measurement system as claimed in claim 1, wherein the one or more processors are further configured to execute code to cause the one or more processors to repeat the execution of the code for each temperature setting in a range of temperatures settings.

3. The test and measurement system as claimed in claim 1, wherein the one or more processors are distributed among the test and measurement device, a test automation system and a machine learning system separate from the test and measurement device.

4. The test and measurement system as claimed in claim 1, wherein the machine learning system comprises a plurality of neural networks, one or more to produce the predicted operating parameters, one to produce a predicted measurement value, and one to produce a set of optimized feed-forward equalization filter tap values.

5. The test and measurement system as claimed in claim 1, wherein the predetermined number of sets of reference parameters is three, one set of average values for the parameters, one set having values higher than the average values, and one set having values lower than the average values.

6. The test and measurement system as claimed in claim 1, wherein the one or more processors are further configured to execute code to cause the one or more processors to apply an inverse normalization to the predicted operating parameters.

7. A method to tune an optical transceiver, comprising:
connecting the optical transceiver to a test and measurement device;
setting operating parameters for tuning the optical transceiver to reference operating parameters by sending the operating parameters to the optical transceiver;
acquiring a waveform from the optical transceiver;
repeating the setting operating parameters and acquiring a waveform, for each of a predetermined number of sets of reference operating parameters;
building one or more tensors from the acquired waveforms;
sending the one or more tensors to a machine learning system to obtain a set of predicted operating parameters;
setting the operating parameters for tuning the optical transceiver to the predicted operating parameters by sending the predicted operating parameters to the optical transceiver; and
validating the predicted operating parameters by receiving a waveform signal from the optical transceiver.

8. The method as claimed in claim 7, further comprising repeating the method for each temperature in a range of temperatures.

9. The method as claimed in claim 7, wherein building one or more tensors comprises building a levels tensor, an impulse tensor, and a combined tensor.

10. The method as claimed in claim 7, wherein building a combined tensor comprises building an image having three or more channels.

11. The method as claimed in claim 10, wherein the image includes a bar graph image representing at least one of a temperature value and a noise value.

12. The method as claimed in claim 7, further comprising generating reference operating parameters, comprising:
tuning a plurality of optical transceivers at a plurality of temperatures;
generating a histogram of each tuning parameter, at each temperature, for the plurality of tuned optical transceivers;
calculating a mean reference parameter set by averaging values for each parameter in the histograms;
increasing values in the mean parameter set to create a first delta reference parameter set; and
decreasing values in the mean parameter set to create a second delta reference parameter set.

13. The method as claimed in claim 7, wherein building one or more tensors comprises building a tensor having three channels, one channel for a mean reference tensor, one channel for a first delta tensor, and one channel for a second delta tensor.

14. The method as claimed in claim 7, wherein sending the one or more tensors to a machine learning system comprises:
sending the one or more tensors to two neural networks in the machine learning system to obtain optimized operating parameters;
sending an impulse tensor to a third neural network to obtain optimized feed-forward equalization filter taps; and
sending a combined tensor to a fourth neural network to obtain a predicted transmitter and dispersion eye closure penalty quaternary (TDECQ) measurement.

15. The method as claimed in claim 7, wherein validating the predicted operating parameters comprises measuring the output of the transceiver and determining if the output is within a predetermined range.

16. The method as claimed in claim 7, further comprising applying an inverse normalization to the predicted operating parameters.

17. A method of training a machine learning system for tuning optical transceivers, comprising:
    creating a predetermined number of sets of reference operating parameters;
    repeating, for each set of reference operating parameters:
        setting the operating parameters for the optical transceiver to a set of reference operating parameters by sending the reference operating parameters to the optical transceiver;
        acquiring a waveform from the optical transceiver;
        tuning the operating parameters of the optical transceiver to meet a desired output; and
        performing transmitter dispersion eye closure quaternary (TDECQ) analysis on the waveform;
    providing results of the analysis and the waveforms to a tensor builder;
    sending one or more tensors to one or more neural networks with the associated waveforms and reference operating parameters; and
    repeating the method until a sufficient number of transmitters have been tuned.

18. The method as claimed in claim 17, wherein creating the predetermined number of sets of reference operating parameters comprises:
    tuning a plurality of optical transceivers at a plurality of temperatures;
    generating a histogram of each parameter, at each temperature, for the plurality of tuned optical transceivers;
    calculating a mean reference parameter set by averaging values for each parameter in the histograms;
    increasing values in the mean parameter set to create a first delta reference parameter set; and
    decreasing values in the mean parameter set to create a second delta reference parameter set.

19. The method as claimed in claim 17, further comprising normalizing the reference parameters.

20. The method as claimed in claim 17, wherein the one or more neural networks comprise one or more neural networks for levels, one network for providing values for feed-forward equalization filters, and one network for a time dispersion eye closure quaternary value.

* * * * *